Figure 1:
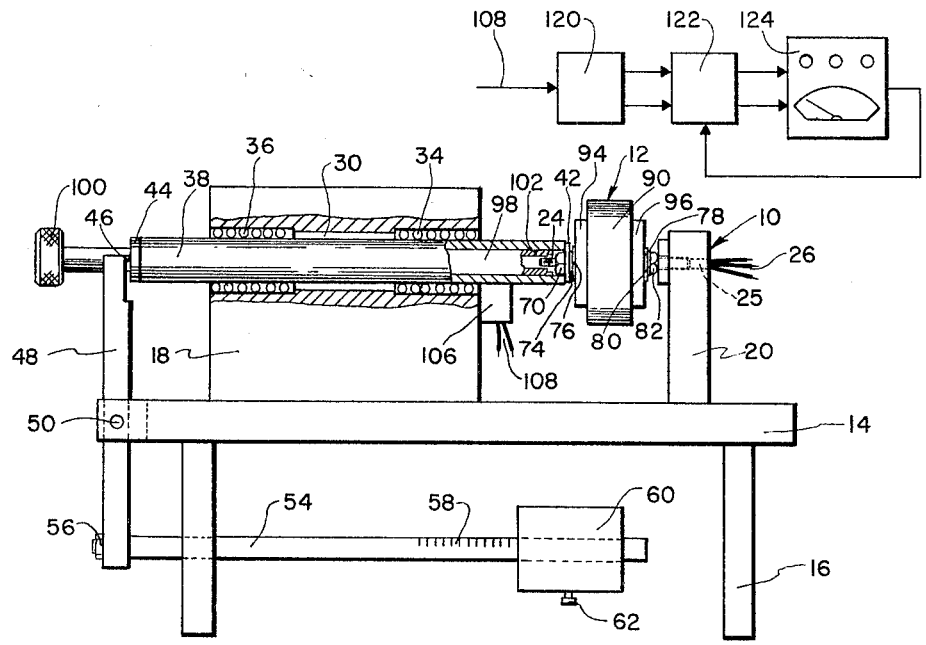

Nov. 29, 1966   G. J. HAAN ETAL   3,287,966
METHOD AND APPARATUS FOR PRESETTING AXIAL
LOAD ON A BEARING ASSEMBLY
Filed March 4, 1964

INVENTORS
GORDON J. HAAN
JOHN M. JESSUP
RICHARD NAMON
BY
ATTORNEYS

United States Patent Office 3,287,966
Patented Nov. 29, 1966

3,287,966
METHOD AND APPARATUS FOR PRESETTING
AXIAL LOAD ON A BEARING ASSEMBLY
Gordon J. Haan, Grandville, and John M. Jessup, Grand
Rapids, Mich., and Richard Namon, Miami, Fla.,
assignors to Lear Siegler, Inc.
Filed Mar. 4, 1964, Ser. No. 349,358
11 Claims. (Cl. 73—140)

This invention relates to a method and apparatus for presetting axial load on a bearing assembly, and more particularly relates to a method and apparatus for presetting the load on a ball bearing assembly for a rotating mass, especially for inertial instruments.

The method and apparatus described and claimed herein was developed for use with rotor bearings of inertial rotor assemblies on inertial instruments such as gyroscopes, accelerometers, etc. Consequently, for purposes of convenience, it will be discussed and described in this context. However, as anyone in the bearing field will clearly see from the concept described, the particular method and apparatus have utility in many other fields where axial bearing load is important.

In a rotor or wheel assembly of an inertial instrument, the annular rotational inertial wheel mass is mounted around an axle and a stator of electrical windings. The rotor is held in its axial position on the axle by a pair of straddling ball bearings. These are compressed very slightly axially against the opposite ends of the rotor to hold it. These bearings are conventionally high precision ball bearing assemblies, with inner and outer races and intermediate balls. The bearings are retained against the rotor by a pair of restraining elements, usually in the form of nuts threaded on the axle. At least one of the nuts is adjustable to allow variation of the compression against the rotor bearings.

In order to achieve the desired results of the precision instrument, the stability of the rotational mass or wheel along the axle must be very exact, such that the rotational mass must not move axially over about 4–5 millionths of an inch during operation. Since the bearings are the only elements maintaining this stability, they must "squeeze" the rotor slightly between them. If they do not, the rotor will have axial "play." However, this "squeezing" raises a delicate problem, since the greater the "squeeze," or more accurately, the axial "pre-load," of the bearings on the rotor, the shorter is the bearing life. In fact, bearing technology shows that the bearing life decreases exponentially with increased pre-load, often as much as the fourth power of the load applied. Hence, a delicate optimum present load must be applied to obtain the smallest possible load which will still provide an exact rotor stability.

Any excess bearing load obtained by providing a safety factor to insure rotor stability decreases bearing life markedly. However, this is normal practice, since stability is so important. Further, the amount of this excess applied to a particular bearing during production is very difficult to determine, therefore causing the bearing life to be rather unpredictable.

Present methods to try to set the pre-load condition include the most common known as "coast time," and others including "dynamic torque," "static deflection" or "push-pull axial deflection," and "power consumption." These methods range in accuracy from 25%–50%. The most commonly used, "coast time," is often inaccurate due to its reliance upon the following variables: (1) lubricant conditions which vary with temperature, turbulence and quantity, (2) windage, (3) alignment, (4) race finish, (5) governor effect of end bells, and others. The "dynamic torque" method has factors of inaccuracy similar to those of "coast time."

Regarding "static deflection" methods, the main disadvantage occurs because the unit is tested when at a stand still but operators at speeds of about 23,000 r.p.m. for example. Dimensional changes occur in the unit from static conditions to full running speed, for example, by bulging of the end bells, causing the axial load to vary. Also, pre-load cannot be accurately checked once it is set by this method.

The "power consumption" method is also affected strongly by the variables listed above for the "coast time" method. However, in spite of the inaccuracies recognized by those in the field in the above known methods, and the difficulty of adapting some to production environment, these methods are normally used, especially "coast time," because of the lack of anything better.

As a result, the actual bearing life of the units is often unpredictable due to the unknown amount of excess pre-load applied to achieve stability.

It is therefore an object of this invention to provide a new, unique method of presetting bearing load under dynamic operating conditions, with complete accuracy, and adaptable readily to production environment.

It is another object of this invention to provide a unique method of presetting bearing load under high speed rotation conditions, employing an unusual parameter existent in the bearing itself, namely vibrational noise effects caused by minute imperfections in the race surfaces and/or the ball surface and sphericity. Yet, in spite of the fact that the parameter is gauged by imperfections in the bearing, the results have proven to allow unusually accurate presetting of bearing load.

It is another object of this invention to provide a unique method of presetting ball bearing axial load on a rotational rotor assembly utilizing vibrational output values from the bearings in a particular relationship.

It is another object of this invention to provide a method of presetting bearing load that enables accurate presetting even though the bearing is preset at a different rotational speed than its operating speed. Yet, the preset condition has been shown to maintain its value at the operating speed. It also can be checked at other than its full operating speed.

Another object of this invention is to provide a novel apparatus for accurately presetting axial bearing load on a bearing assembly, especially a bearing assembly for an inertial wheel assembly in an instrument. The apparatus is highly useful in production. It repeatedly produces accurate results. It enables quick, easy, presetting of the bearing load by a relatively unskilled person, yet with complete reliability. Moreover, the value can be set at a known amount with just sufficient minimum load to provide axial rotor stability, yet free from excess load which drastically shortens bearing life. The equipment is moreover relatively inexpensive. It is adaptable quickly and inexpensively to various production conditions as necessary.

Figure 2:
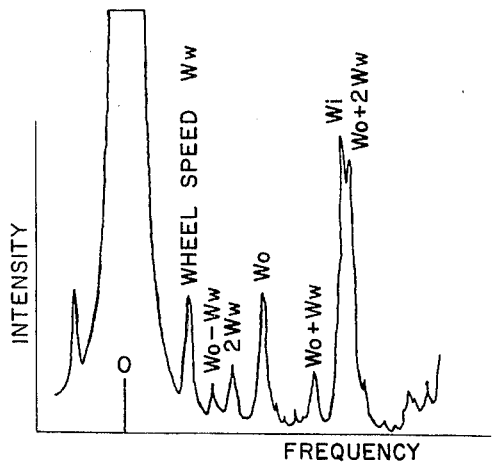

These and several other objects of this invention will become apparent upon studying the following specification in conjunction with the drawings in which:

FIG. 1 is a side elevational view of the novel apparatus shown in combination with a rotor assembly being preset by the novel method; and FIG. 2 is an illustrative graphical representation of the vibrational output of a bearing assembly, illustrating one particular operational run of the apparatus in FIG. 1.

Referring now specifically to the drawings, the novel presetting apparatus 10 is shown combined with a rotor assembly 12 being preset.

The apparatus 10 includes a suitable stand 14 having legs 16. Upon the stand is secured a pair of spaced vertical end mounts 18 and 20. Mount 20 serves as the main wheel support. It includes a through opening 25 and an orificed sleeve block 22 receiving the end of the rotor axle 24. The electrical leads 26 to the driving stator inside the rotor assembly extend through the opening 25 and axle 24 to the inner stator of the conventional rotor assembly.

Mount 18 basically comprises a pillow block type means, having a through axial opening 30 aligned with axle 24 of the rotor assembly and with opening 25 in mount 20. This through opening has suitable radial support roller bearings 34 and 36 mounted therein. Fitted within these bearings and through this opening is a thrust rod 38. It has one end extending out the back side of the pillow block mount and another end extending out the forward side. The thrust rod is tubular, i.e. hollow, over its length, having its forward annular face abutted against a thrust washer 42 on the axle of the rotor assembly. The rearward end of the thrust rod includes an annular face plate 44 in sliding engagement with protrusion finger 46 on the upper end of pivot rod 48.

This pivot rod applies an axial force along the length of the thrust rod. The rod is axially shiftable in mount 18. It is rotationally supported for minor rotational movement. Pivot rod 48 is pivotally mounted intermediate its ends at 50 to support 14. Attached rigidly to its lower end is an elongated rod 54 secured by nut 56. It extends generally transverse to the axis of elongated vertical pivot rod 48. At the outer end of rod 54 is a plurality of graduations 58 and a shiftable annular surrounding weight 60. Sliding of the weight causes its axial movement along rod 54 for adjustment of the moment arm of this weighted rod 54. This causes a varying axial thrust from the upper end of the pivot link to the thrust rod, thus to thrust washer 42 of the rotor assembly. A set screw 62 retains annular weight 60 in a particular position when preset, to maintain a fixed relationship with respect to pivot rod 48. The graduations 58 are pre-calibrated to achieve a particular axial thrust from the upper end of the pivot rod when the weight is at a particular position.

The forward end of the thrust rod fits over a bearing retaining nut 70 with significant clearance to be out of contact with the nut when engaging thrust washer 42. The thrust washer 42 abuts against inner race 74 of the ball bearing assembly on the left end of the rotor assembly (as viewed in FIG. 1). However, the thrust washer is out of engagement with the outer face of outer race 76 of this bearing assembly. On the opposite end of shaft 24, which extends through the rotor assembly, is a second bearing assembly, including an outer race 78 and an inner race 80 against which the second retaining nut 82 abuts. Normally nut 82 is fixed in its position after it is once attached to axle 24. By adjustment of nut 70 against inner race 74, the amount of axial bearing load or compressive "squeeze" on the rotor wheel is controlled to maintain the wheel 90 in a particular stable, axial position. This wheel includes a pair of end bell housing portions 94 and 96 in conventional fashion, in the usual form of the rotor assembly. As is conventional, the rotor has electrically actuated driving stator means inside, fixed on axle 24 to drive the rotor around as an inertial mass. Since this is so well known, the description is not cluttered with it. Nut 70, due to its threaded engagement with the axle, can be adjusted to apply varying amounts of pressure on the bearings by utilizing an elongated rotatable wrench member 98. It protrudes out the rear end of hollow thrust rod 38 to a knurled adjusting knob 100. The forward end of the wrench includes a fitting 102 for engagement with nut 70 to rotate it as necessary. The wrench element is independently slidable inside of thrust rod 38.

The wheel assembly must be initially be supported on both ends by mount 20 and thrust rod 38 when nut 70 is loose. When the nut is tightened by wrench 98, both the wrench and thrust rod may be withdrawn while operating the assembly.

This invention is possible because of the vibrational "noise" of operating bearing assemblies. When a bearing assembly is rotated, especially at high speeds, bearing vibrational "noise" will occur, as is known to those skilled in the bearing art. In fact, no matter how precisely the bearing components are made, and how exacting are the methods of formation and assembly, there are still slight irregularities in the outer race surface, the inner race surface, the individual ball surfaces, and the ball sphericity to create noise of a definite detectable degree. The "noise" is not a random value, but rather several pronounced "peaks" occur in the vibrational pattern at specific frequencies of vibration. These frequencies are related to wheel speed. The height of the "peaks," i.e. the intensity of noise varies from one bearing assembly to another, depending on its individual characteristics. Thus, referring to FIG. 2, when the rotor assembly is operating at a constant speed, and a scan is made of the vibrational output of the bearing assembly over a range of frequencies, a graph like that illustrated is obtained. This graph was actually obtained from a gyroscope rotor operated in the test lab. It is illustrative of the great many runs made before this invention was completed.

When the rotor assembly is operated, and a vibrational action occurs, the total vibrational output detected by any suitable detection means such as a piezoelectric crystal 106, is used as an indicating parameter. The pick-off is shown adjacent the left end bearing, but can be applied adjacent the opposite bearing since both are loaded simultaneously and equally. This converts the mechanical vibration into electrical signals delivered through lead 108 to a read-out indicating instrument. In practice, this total composite of varying frequency signals has often been fed through a conventional filter amplifier 120 which separates the signals into selected output frequencies. These are fed through a relay 122, which is controlled by the operator, and into an instrument 124 known as a Stroboconn, which is a logarithmic based device used for frequency measurements. Since the particular measuring apparatus is conventional, its details are not described herein. Alternatively, a digital display unit (not shown) has been employed. The signals are passed through a signal gate and into this digital display to be indicated on decade counters in conventional fashion. Instead of the piezoelectric pick-off, a simple phonographic type pick-off or any other suitable equivalent can be employed.

Referring again to FIG. 2, when a rotor assembly is spun at a high speed and the pick-off is used to detect the particular vibration being involved, as the detecting unit is scanned over the range of vibrational frequencies, a graph similar to that in FIG. 2 occurs. It should be noted that this graph with its peaks and valleys, will shift with each different bearing, different bearing speed, and different axial load. Each bearing has its own characteristics due to its own imperfections. Depending upon rotor speed, vibrational peaks occur at different frequencies.

The particular peaks on the intensity or magnitude vs. frequency graph can be identified readily as (1) the wheel speed vibrational frequency, (2) the outer race vibrational frequency, (3) the ball speed vibrational frequency, and (4) the inner race vibrational frequency. This is because of the relation of these characteristics to the rotor speed. More specifically, when the wheel is spinning, a slight unsymmetrical weight distribution of the wheel mass causes the wheel to vibrate slightly and rapidly. This will cause a frequency related directly to the r.p.m. of the wheel. On the other hand, an imperfection in the bearing surface of the outer race will generate a vibration of a different frequency other than wheel speed. The outer race frequency is a function not only of wheel speed, but also of the action of the rotating balls on the race surface as they move around the fixed inner race. Further, frequencies generated by irregularities on the ball surfaces or ball sphericity will be different according to their rate of rotation. Finally, an irregularity on the bearing surface of the inner race will generate still a different characteristic frequency. These are easily identified on a graph in relation to the wheel speed. These are designated for convenience on the graph of FIG. 2 where the symbols signify frequencies as follows:

| Parameter: | Symbol |
| --- | --- |
| Wheel speed frequency | $Ww$. |
| Outer race frequency | $Wo$. |
| Inner race frequency | $Wi$. |
| Second harmonic of wheel speed | $2Ww$. |
| Ball frequency | $Wb$. |
| Lower side band | $(Wo-Ww)$ or $Wp$. |
| Upper side band | $(Wo+Ww)$. |

The particular frequencies normally change with different axial loads applied. Yet, it has been determined by ingenuity and experimentation that the bearing preload can actually be accuartely set by employing these vibrational frequencies as an indicating parameter. Therefore, the basic concept herein is to provide such a method. By so doing, a preset load is applied to the bearing assembly of the rotor of an amount necessary to provide the exact stability of the assembly, and yet kept at a minimum amount to keep bearing life at a maximum.

This is done, more specifically, by first applying a releaseable axial bias (to the bearing) of an amount equal to the load necessary for stability and equal to the preset load desired. With this bias applied, the vibrational output frequencies of the spinning mechanism are detected and accurately measured. As stated, the frequencies of vibration are dependent upon the amount of pre-load applied. By attaching the piezo-electric crystal against any stable surface portion of the assembly that is in contact with the rotor (for convenience on thrust rod 38 but alternatively on any of the other contacting components), these vibrational effects at various frequencies can be readily detected. By applying this standard bias equal to the desired preset load, then measuring the vibration frequencies very precisely, then determining the ratio between the two selected frequencies, then tightening the adjusting nut 70 just enough to duplicate this ratio, with the bias relaxed, the bearing pre-load is very accurately attained. For the present wheel designs the frequencies which are detected and measured are the wheel speed ($Ww$) and the frequency ($Wo-Ww$) which we shall arbitrarily designate as $Wp$ and name "bearing pre-load frequency." The ratio is determined by dividing $Wp$ by $Ww$, or in equation form: Ratio $= Wp/Ww$. When read out on the logarithmic based device, the two frequencies are read as logarithmic numbers. Thus, subtraction of one logarithmic number from the other performs a division process which is very accurate and simple to perform. If a digital set up is used, this division process can be accomplished by digital circuitry and the actual ratio can be displayed on a digital read-out. The operator then has the task of reading only this number.

Further, it has been determined that even when the rotational speed of a particular assembly is changed, and even though the other frequencies change, this particular ratio stays constant. The advantage of this is very significant in that, even if the wheel is preset when there is a varying rotational speed, this ratio will remain constant. Since this ratio changes only with changes in preload, the pre-load can be accurately set by this and will itself remain constant.

Further, the pre-loading effect can be quickly rechecked at any time when using this ratio as a parameter, even when the rotor is operated other than at identical speeds at which it was originally preset. Extensive experimentation has proven unusually high accuracy resulting from this method. A pre-load accuracy of 5%–10% is possible with this method and apparatus.

Preferably, the apparatus in FIG. 1 is employed for this method. The standard biasing force is applied to the bearings of the rotor assembly by first inserting axle 24 in mount 20, connecting leads 26 to a power supply, and adjusting weight 60 to obtain the selected axial thrust on thrust washer 42. When the rotor is spinning, the output vibrations are detected by crystal 106 and fed into the filter 120 to the indicator 124. By varying the filter selection, a scan can be made of several frequencies, if desired.

When a compressive load is applied axially against the inner races of the bearings, it will be appreciated that the inner races are shifted axially slightly with respect to the outer races. This changes the "contact angle" of each ball with its outer and inner races. The "contact angle" is determined by a line drawn between the opposite points of contact of each ball with its inner and outer races. This line, if perpendicular to the axis of the bearing, forms a "contact angle" of 0 degrees. If the line is other than perpendicular to the bearing axis of rotation, a small contact angle occurs, e.g. of 20°–30° from the norm. If the inner race is shifted slightly axially, the ball will contact the inner and outer races at places slightly displaced from the original contacts, to change the contact angle.

One of the inventors herein, operating on his theory that the only significant physical change occurring in the bearing when the axial load is adjusted is in the bearing "contact angle," has pursued a mathematical relationship and has conducted corresponding experimentation which would indicate that one particular frequency is especially useful in presetting the bearing load. This frequency is designated as $Wp$, and is identified as the bearing pre-load frequency.

It was found that a frequency peak occurred in every bearing assembly tested. Yet, this frequency does not appear to be the direct result of any one element of the bearing. Upon closer and lengthy examination calculations based upon "contact angle" relationships, and actual experimentation, it was decided by this inventor that the special frequency is a mathematical combination of two frequencies, one of which is directly caused by the outer race element in the bearing, the other by wheel unbalance.

It was determined during experimental operations that this frequency peak occurred with each bearing tested, although at different frequencies with wheel speed and at different intensities and frequencies with different bearings. Repeated experimentation has convinced this particular inventor that this previously unidentified frequency is a lower side band resulting from mechanical modulation of the two frequencies mentioned, the modulating being performed by the bearing. It should be noted that, regardless of this theory, this particular frequency is recognized by the inventors herein as very useful in this determination, whatever its source. It is easily identified on vibrational scan charts. This frequency has a relatively high percentage frequency change with change in pre-load, and has a consistently large magnitude of intensity. Because of these factors, the setting of the pre-load is much easier when utilizing this particular frequency since the change in setting is quickly detected due to the relatively large percentage change at this frequency.

The mathematical derivation which led to the probative explanation of this frequency proceeds as follows. Assuming that the wheel speed vibration is sinusoidal due to its weight irregularities, and that the outer race vibration is a series of pulses due to irregularities in the outer race surface, the modulation of these two signals will produce a frequency term $KA_wA_o \cos(W_o-W_w)t$ which is just one in a series of many terms, where:

$K$ = a modulation index
$A_w$ = amplitude of wheel frequency
$A_o$ = amplitude of outer race frequency
$W_o$ = outer race frequency
$W_w$ = wheel frequency
$t$ = time If the frequency $(W_o-W_w)$, which we call $W_p$ or the "bearing pre-load frequency," is divided by the wheel speed $W_w$, we obtain the ratio which is used as a parameter for the pre-load indication. Thus, $$\text{Ratio} = \frac{(W_o-W_w)}{W_w} \text{ or } \frac{W_p}{W_w}$$

The final step is now to prove that this ratio is independent of wheel speed.

From bearing equation we find that $$(W_o-W_w) = W_p = W_w\left[N\left(1-.5\frac{d}{E}\cos B\right)-1\right]$$

where $N$ = number of balls
$d$ = ball diameter
$E$ = pitch circle diameter
$B$ = contact angle The equation for the ratio then becomes $$\text{Ratio} = \frac{W_w\left[N\left(1-.5\frac{d}{E}\cos B\right)-1\right]}{W_w}$$

or finally $$\text{Ratio} = N\left(1-.5\frac{d}{E}\cos B\right)-1$$

where

N, d, E are constants depending on bearing design.

This then is the desired equation since it is obvious that the only variable in the equation is B, the contact angle, which is a function of the bearing load.

Hence it is believed that at any speed of the bearing, the vibration change with load change must be related to change of contact angle, and is most accurately reflected in the ratio of these two frequencies, $W_w$ and $W_p$.

The ratio which is used must be measured very accurately and changes of 0.025% must be readable. This is due to the very small contact angle change per pound of pre-load in most bearing designs. The bearings used in the wheels tested often had a contact angle change of approximately six minutes per pound of pre-load with nominal running contact angle being about 25°. It was found that even when the rotational rate of the particular wheel being employed was changed, and the frequencies themselves changed, still the ratio of $W_o-W_w/W_w$ stayed substantially constant, serving as an excellent parameter. Consequently, this ratio could be checked at any later date merely by mounting the unit on the test stand, or any other suitable means of support, reading the vibrational frequencies picked off, and relating these frequencies.

Consequently, this rather unexpected method of testing achieves extremely accurate operations. It is readily adapted to production conditions.

This special ratio is employed since the speed of the rotor changes with axial load. In some instances the driving motor may be a synchronous motor, however. Consequently, the rotor speed would stay constant with varying bearing load. In such an instance, the special ratio need not necessarily be used to obtain a useful parameter since for example, the frequency $(W_o-W_w)$ would be directly useful. In fact, $W_o$ or other frequencies could even be employed as an indicating parameter.

It is conceivable that certain portions of the preferred form of the apparatus illustrated can be modified somewhat while achieving the concept set forth. Consequently, these minor variations in the apparatus, as well as minor variations in the method within the concepts taught, are deemed to be part of this invention which is to be limited therefore only by the scope of the appended claims and the reasonable equivalents thereto.

We claim:

1. A method of presetting the bearing load of a bearing assembly having bearing load adjustment means thereon, comprising the steps of: applying to the bearing a selected standard axial bias equal to the pre-load desired; rotating the bearing; detecting a vibrational output frequency condition under said bias; relaxing said bias; and adjusting the load adjustment means until a like vibrational output frequency condition is obtained.

2. A method of presetting bearing load of a bearing having inner and outer races with rolling elements therebetween and adjustable axial loading means therefor, comprising the steps of: applying to the bearing an axial biasing force equal to the pre-load value desired; rotating the bearing and creating a vibrational output; detecting the frequency of said vibrational output; relaxing said force and adjusting said loading means to increase the pre-load an amount just sufficient to again obtain said vibrational frequency.

3. A method of presetting the axial bearing load on a bearing assembly of a rotor mechanism comprising the steps of: mounting the rotor mechanism; applying a preselected standard biasing force axially of said bearing assembly; rotating said rotor mechanism and causing vibration of said bearing assembly; detecting the value of said bearing vibration at a selected frequency related to bearing speed; relaxing said force, and tightening a settable pre-loading means against said bearing assembly until said vibration frequency value is reproduced.

4. A method of presetting the axial bearing load on a bearing assembly of a rotor mechanism comprising the steps of: mounting the rotor mechanism; applying a preselected standard biasing force axially of said bearing assembly; rotating said rotor mechanism; detecting the wheel speed frequency; detecting the side band frequency substantially equal to outer race frequency minus wheel speed frequency, determining the ratio of said side band frequency to said wheel speed frequency; and relaxing said force, and tightening a settable pre-loading means against said bearing assembly until said ratio is reproduced.

5. A method of presetting the axial load of a pair of ball bearings on an axle straddling a spinning rotor and having a pair of straddling restraining elements, comprising the steps of: mounting the rotor on its axle; restraining with one of said restraining elements one bearing against axial movement of said one bearing and said rotor on the axle in the direction toward said one restraining element; applying a biasing force axially against the other bearing toward the rotor with a biasing force equal to the desired bearing load; spinning the rotor on the bearings; detecting the vibrational output frequency condition related to bearing speed; and relaxing said force, and increasing the bearing load by adjusting the other restraining element until said vibrational output frequency condition is again obtained.

6. A method of presetting the axial load of a pair of ball bearings straddling a spinning rotor and having a pair of straddling restraining elements, comprising the steps of: mounting the rotor on its axle; restraining with one of said restraining elements one bearing against axial movement on the axle away from the rotor; applying a biasing force axially against the other bearing toward the rotor with a biasing force equal to the desired bearing load; forceably spinning the rotor on the bearings; detecting the vibrational output frequencies from said bearing; determining the relationship of wheel speed frequency to outer race frequency; relaxing said force, and increasing the bearing load by adjusting the other restraining element until said relationship is again obtained.

7. Apparatus for pre-loading a bearing assembly on a rotor mechanism having a rotor, an axle, a pair of bearings on said axle straddling said rotor, and restraining means for varying the compressive load of said bearings on said rotor, comprising: support means capable of supporting the axle of the rotor assembly while allowing the rotor to spin; biasing means positioned and mounted to apply a releasable, standard biasing force axially of said rotor assembly on said bearings; detecting means for picking off vibrational frequencies from said assembly; and means for adjusting said restraining means while allowing release of said biasing force to duplicate a selected vibrational frequency.

8. Apparatus for pre-loading a bearing assembly on a rotor mechanism having a rotor, an axle, a pair of bearings on said axle straddling said rotor, and restraining means for varying the compressive load of said bearings on said rotor, comprising: support means capable of supporting the axle of the rotor assembly while allowing the rotor to spin; biasing means positioned to apply a releasable, standard biasing force axially of said rotor assembly on said bearings; detecting means for picking off vibrational values from said assembly; adjustment means operably connected to said biasing means to enable biasing force variations on said assembly; electrical signal producing detection means for detecting vibrational frequencies from said assembly; and means for adjusting said restraining means while allowing release of said biasing force to duplicate vibrational output frequencies.

9. Apparatus for pre-loading a bearing assembly on an inertial rotor mechanism having a rotor on an axle, a pair of ball bearings with inner and outer races and intermediate balls, and a pair of restraining members on said axle straddling the rotor and bearings, at least one of said restraining members being adjustable to vary compression of said bearings against opposite axial ends of said rotor, comprising: a support stand; a pair of spaced rotor axle mounts on said stand; one of said mounts having means for holding one end of the axle; the other mount having means for receiving a biasing force thrust rod, and a thrust rod therein; adjustable biasing means applicable axially on said thrust rod; said thrust rod being axially aligned with said holding means to apply a releasable axial biasing force against the rotor bearings; said thrust rod being axially shiftable in said other mount to be releasable from the bearings; and shiftable means to adjust said one restraining member independent of said thrust rod.

10. The apparatus in claim 9 wherein said one restraining means comprises a nut threadably engaged on said axle, said rod comprises a hollow element fitting over and around said nut against the adjacent bearing, and said shiftable means comprises a wrench member slidable axially inside said hollow member and having engagement means on its end for said nut.

11. Apparatus for controlling axial load on a bearing assembly with inner and outer races and intermediate balls and adjustable axial load setting means, comprising: bearing mounting means; means to rotatably drive the bearing on said mounting means; shiftable means for releasably applying an axial bias on said bearing assembly; vibration detecting means for contact with said apparauts to detect bearing vibrations; and shiftable adjustment means for said axial load setting means independent of said biasing means.

References Cited by the Examiner
UNITED STATES PATENTS

| | | | |
|---|---|---|---|
| 2,787,905 | 4/1957 | Prestipino et al. | 73—67 |
| 3,100,989 | 8/1963 | Jones | 73—140 |

RICHARD C. QUEISSER, *Primary Examiner.*